United States Patent [19]
Ford

[11] Patent Number: 6,149,183
[45] Date of Patent: Nov. 21, 2000

[54] SNAP-IN AIR BAG MODULE, CONNECTOR AND METHOD OF ATTACHMENT

[75] Inventor: Brian C. Ford, Mt. Clemens, Mich.

[73] Assignee: Breed Automotive Technology, Inc., Lakeland, Fla.

[21] Appl. No.: 09/150,256

[22] Filed: Sep. 9, 1998

[51] Int. Cl.[7] .............................. B60R 21/20; F16B 21/08
[52] U.S. Cl. ......................... 280/728.2; 411/46; 411/510
[58] Field of Search ................................ 280/728.2, 731, 280/732; 403/326, 328; 411/508, 509, 510, 913, 45, 46, 410

[56] References Cited

U.S. PATENT DOCUMENTS

| | | | |
|---|---|---|---|
| 3,319,918 | 5/1967 | Rapata . | |
| 4,403,377 | 9/1983 | Mizusawa . | |
| 4,952,106 | 8/1990 | Kubogochi et al. | 411/48 |
| 5,201,623 | 4/1993 | Benedetti et al. | 411/48 |
| 5,211,519 | 5/1993 | Saito | 411/45 |
| 5,316,423 | 5/1994 | Kin | 411/510 |
| 5,333,897 | 8/1994 | Landis et al. | 280/728.2 |
| 5,387,065 | 2/1995 | Sullivan | 411/48 |
| 5,562,375 | 10/1996 | Jackson | 411/48 |
| 5,568,675 | 10/1996 | Asami et al. | 24/453 |
| 5,624,130 | 4/1997 | Ricks | 280/728.2 |
| 5,632,581 | 5/1997 | Hasada | 411/48 |
| 5,755,458 | 5/1998 | Donovan | 280/728.2 |
| 5,765,860 | 6/1998 | Osborn et al. | 280/728.2 |
| 5,775,860 | 7/1998 | Meyer | 411/46 |
| 5,846,040 | 12/1998 | Ueno | 411/45 |

*Primary Examiner*—J. J. Swann
*Assistant Examiner*—David R. Dunn
*Attorney, Agent, or Firm*—Markell Seitzman

[57] ABSTRACT

A snap-in connector (80) including a female connector part (84) including an upper cylindrical portion (120) having a first opening (122) therethrough, a medial flange (130) extending outwardly and a lower portion segmented into a plurality of flexible locking members (140a–d) which snap into and lock with portions of a male connector part as a function of the degree of insertion of the male connector part. The male connector part (84) including a connecting first end (92) and a remote tool receiving second end (92) and a plurality of conical portions which serve to separate the flexible members as the male connector part is inserted therein, a first holding feature (100) and a first snap-fit locking feature (106) and situated between a second conical portion and a third conical portion (112), the diameter of the first snap-fit locking feature being sufficient to separate the flexible members (140a–d) outwardly relative to the edge of an opening (64a) in a receiving member (40) as a function of the further insertion of the male connector part in the female connector part, to prevent withdrawal of the snap-fit connector and support member (24).

12 Claims, 12 Drawing Sheets

SNAP-IN AIR BAG MODULE, CONNECTOR AND METHOD OF ATTACHMENT

BACKGROUND AND SUMMARY OF THE INVENTION

The invention generally relates to air bag modules and more specifically to those which may be snap-fit into a receiving member, such as a steering wheel or other component within the passenger compartment of the vehicle such as a vehicle seat or part of the instrument panel.

It is an object of the present invention to provide a means for enabling an air bag module to be snap-fit onto a steering wheel or other vehicle structure.

Accordingly the invention comprises: a snap fit configuration for an air bag module to enable the module to be snap fitted to a cooperating support member of a vehicle: the module including at least a housing with first means for receiving at least two snap fit connectors, the cooperating structure receiving openings therein corresponding to the number of snap fit fasteners. Each snap-in fit connector comprises a male connector part and a female connector part, the female connector part being of annular construction and having a flanged portion, a plurality of separated, flexible members, extending from the bottom surface of the flanged member, each of the flexible members including a remote end having an inward flange, an interior surface of each flange being spaced from an adjacent flange to form a first passage aligned with the first opening to receive a portion of the male connector part. The male connector part includes a threaded first end adapted to be attached to a support member, and a remote second end which is inserted into and through the first opening and first passage of the female connector part, the second end including a tool receiving tip enabling the male connector part to be rotated by a tool for removal from and attachment to the support member, the male connector part further including a first conical portion having an increasing diameter as a function of distance from the second end; a second conical portion spaced from the first cylindrical portion and having an increasing diameter as a function of distance from the remote end; a first groove separating the first and second conical portions, the diameter of the first groove being smaller than that of the first passage of the female connector part so that the flexible members are not biased outwardly when upon the first groove; a third conical portion spaced from an end of the second conical portion and having a decreasing diameter as a function of the distance from the remote end; a second groove separating the third and second conical portions having a diameter greater than that of the first passage sufficient to cause the flexible members to expand and lock therein upon further insertion of the male connector part through the female connector part.

Many other objects and purposes of the invention will be clear from the following detailed description of the drawings.

DETAILED DESCRIPTION OF THE DRAWINGS

Figure 1:
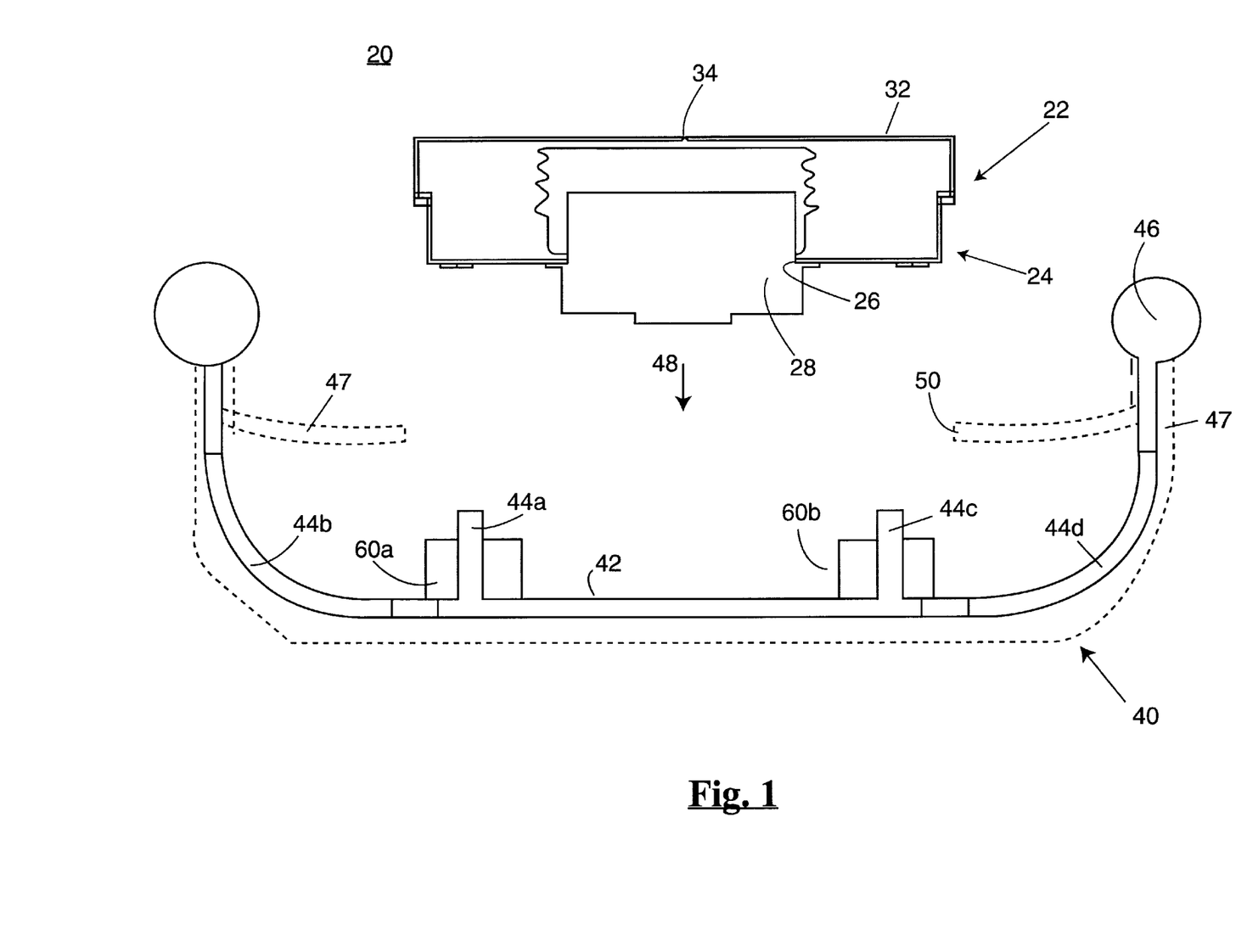
FIG. 1 illustrates an air bag module spaced apart from a steering wheel.
Figure 2:
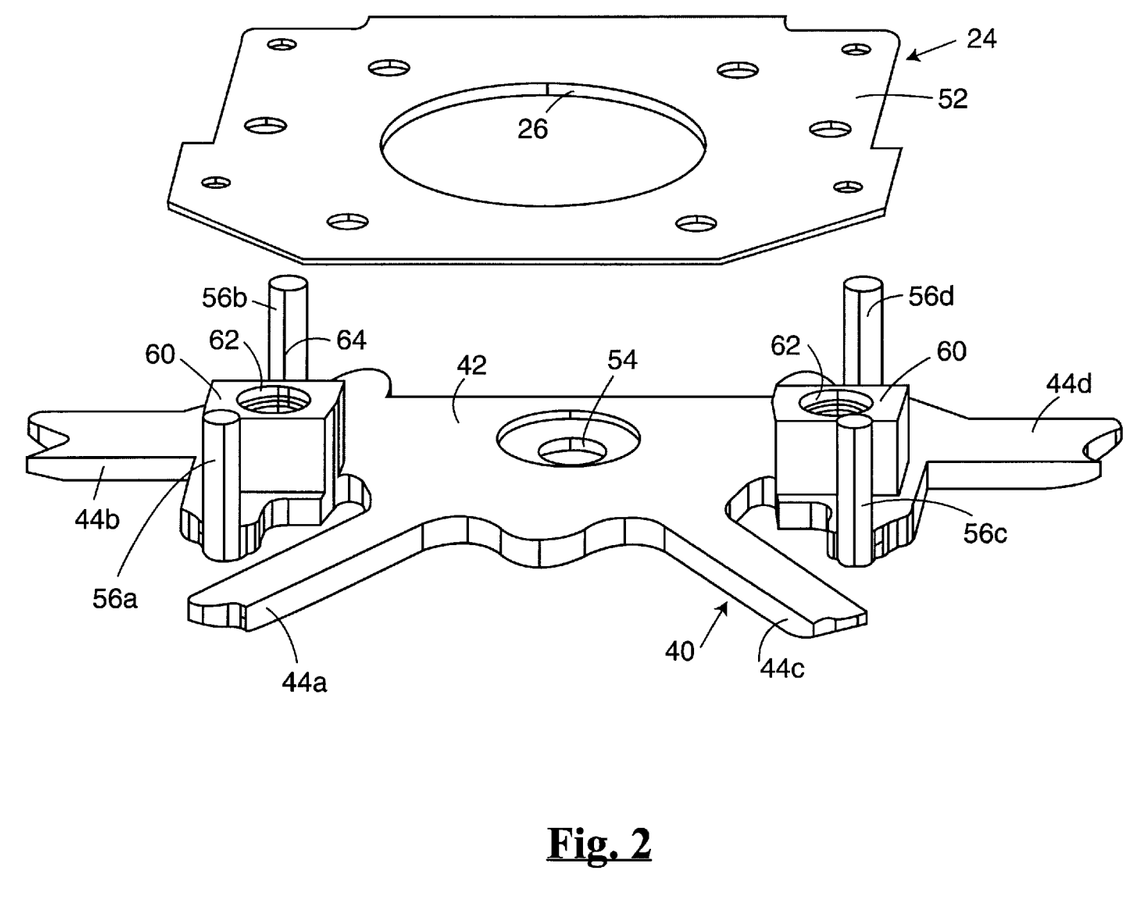
FIGS. 2 and 3 are isometric views illustrating major components of the present invention.
Figure 3:
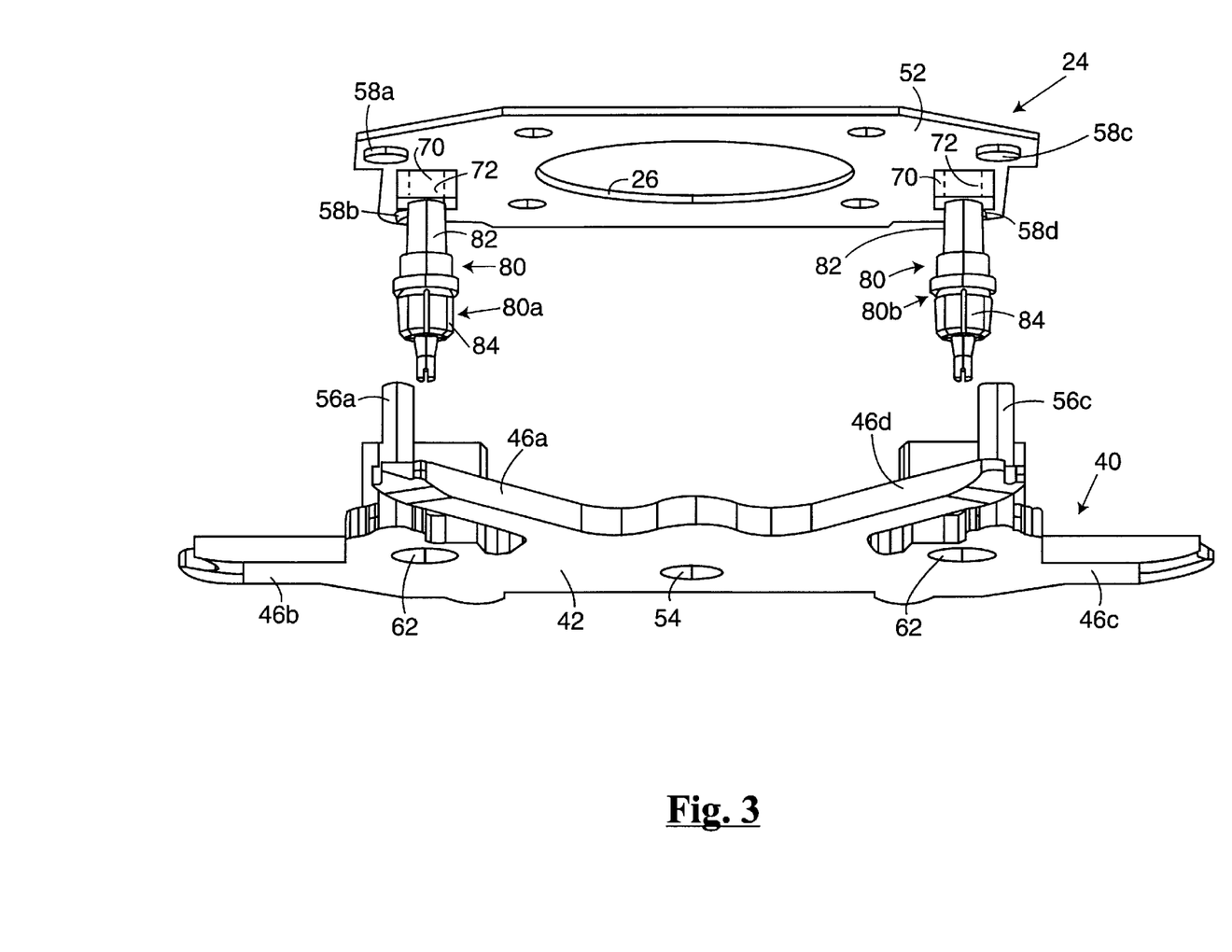

Reference is made to FIGS. 1–3 which show various views of an air bag safety restraint system comprising an air bag module 22 and a support member such as a steering wheel, instrument panel or seat structure 40. The module 22 comprises a housing 24 having a central opening 26. An inflator of known construction 28 is positioned upon the housing near the opening 26. A cover 32 is optionally secured to or near the housing 24. The cover includes a tear seam 34. Upon activation of the inflator, inflation gas is communicated to the air bag which inflates. As the air bag inflates, it forces open the cover along the tear seam 34. The module 22 is snap fit to the support member 40. The features which permit this snap-fit engagement are described below. It should be appreciated that this invention can be used for modules other than those attached to a steering wheel.

The steering wheel 40 is exemplary of many steering wheels that are available in the automotive industry. Steering wheels typically include a center portion or armature 42 and a plurality of spokes 44a–d which transition from the armature 42 to a circular rim 46. This internal support structure is covered by plastic, wood veneer, or leather, or trim components of various other materials. During assembly, the module 22 is moved downwardly along the direction of arrow 48 to fit within an opening or cavity 50 formed within the steering wheel 40. FIGS. 2 and 3 are isometric views of a portion of the module 22 and a cutaway section of the steering wheel 40. For the purposes of clarity, a greater portion of module 22 is not shown in FIGS. 2 and 3; more specifically, only the bottom 52 of the housing is shown in FIGS. 2 and 3. Additionally, FIGS. 2 and 3 show the armature of the steering wheel, however, a portion of the various spokes 44a–44d and the rim 46 have also been removed. The armature includes a receiving opening 54, positioned generally in the center of the steering wheel, which permits the connection of the steering wheel to a steering column (not shown). Located about the opening 54 is a plurality of spacing pins 56a–d. These pins react with a like plurality of bosses 58a–d situated on the lower surface of the bottom 54. The pins and bosses function as alignment features and permit the module to be mounted in a preferred orientation relative to the outer trim portion of the steering wheel. As is known in the art, the steering wheel can be manufactured from a steel stamping or by the casting of various metallic alloys. It is preferable and more cost effective that the internal structure of the steering wheel be manufactured via a casting process. The steering wheel additionally includes a plurality of installation features generally shown as 60 which can be integrally formed as part of the armature 42 or attached thereto as separate features.

Each installation feature 60 includes a stepped bore 62 of predetermined thickness. Each bore 62 includes an inwardly directed flange or ledge 64 as more completely shown in FIG. 9. The flange 64 reduces the diameter of bore 62 to define an opening 64a of pre-determined size to receive a snap-fit connector. The installation features 60 can be replaced with a thin metal plate with openings 64a supported on the steering wheel. In addition, as will be seen below, the flange 64 (or plate) has a pre-determined thickness.

FIG. 3 is an isometric view of the bottom 52 of the housing 24 and steering wheel 40. As can be appreciated, the line of sight in this view is to the bottom of the housing 24 and steering wheel 40. This figure illustrates further components of the present invention. More particularly, it can be seen that the bottom 52 includes a plurality of receiving supports or receiving features which are utilized to receive a respective end of part of the snap-fit connector. In the embodiment shown, two threaded fasteners 70 are secured to the bottom 52. These fasteners include a threaded bore 72. It should be appreciated that if the thickness of the bottom 52 (of the housing) is sufficient, the threaded bores 72 can be fabricated within the bottom itself, thereby eliminating the need for the fasteners 70. FIG. 3 shows two snap-fit connectors 80 secured to a respective mounting feature such as the threaded fasteners 70. Each snap-fit connector includes a male connector part 82 and a female connector part 84 which is slidably received thereon.

Figure 4:
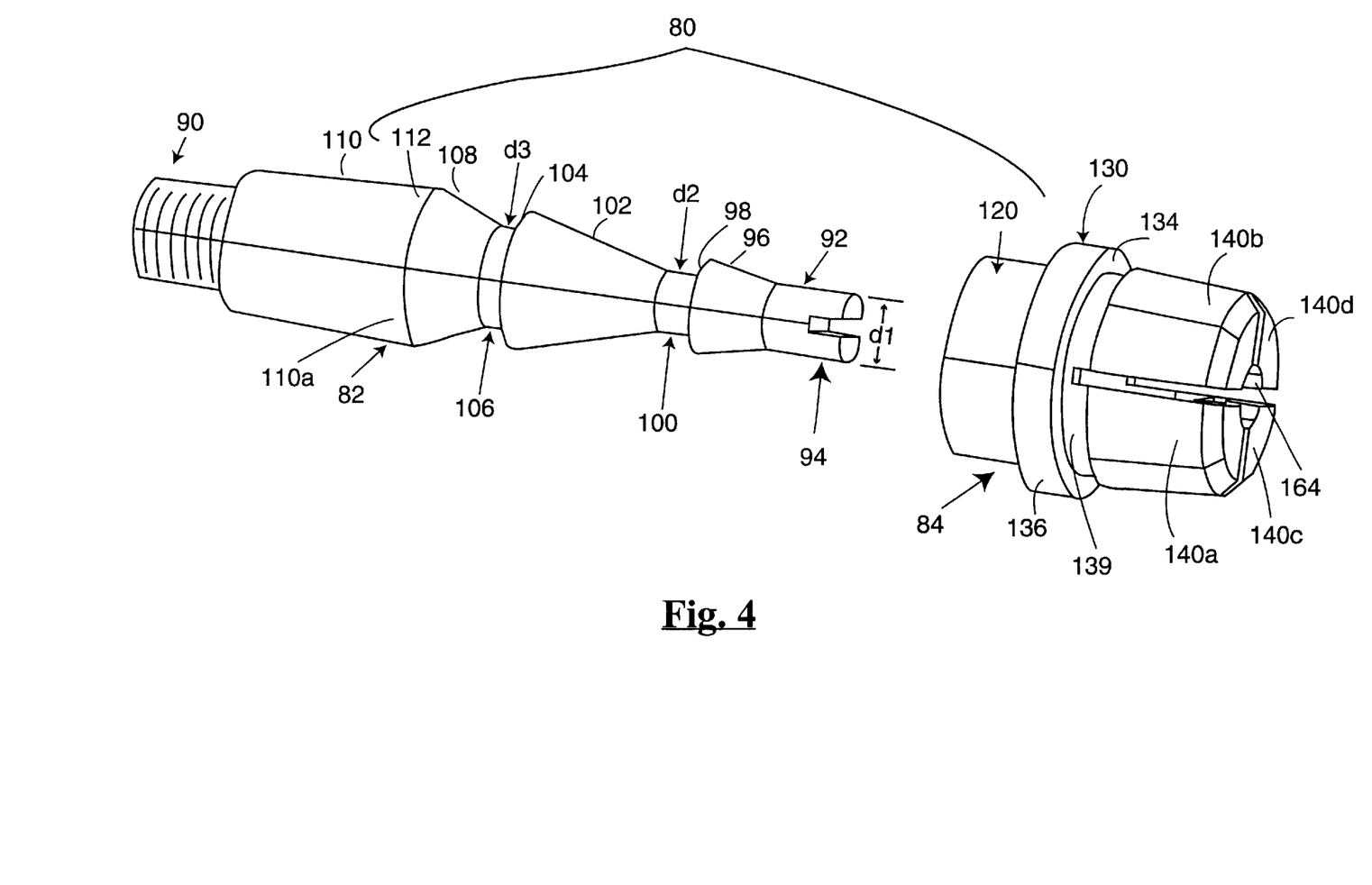
FIG. 4 is an isometric view showing the male and the female portions of a snap-fit connector.

Reference is briefly made to FIG. 4 which illustrates an isometric view of the male 82 and female 84 snap-fit connector parts of a respective connector 80. In the preferred embodiment, the male connector part 82 is constructed of steel. Alternatively, a polymer or metallic alloy material can be substituted. The male connector part 82 includes a first or fastening end 90. This end 90 may include threads for attachment to a respective fastener 70 or, alternatively this end can be formed as a press-fit or rivet shaft, in which case the end 90 of the male connector part 82 will be inserted within an opening within the bottom 52 and pressed in or riveted thereon for permanent attachment to the housing 24. The male connector part additionally includes a remote, opposite second end 92. End 92 is formed with a tool-receiving tip 94. As illustrated, this tool-receiving tip is slotted to receive a flat screwdriver, however, a torx, phillips-head screwdriver, hexagonally-shaped tip (or other shape tip) 94 can be substituted. The diameter d1 of end 92 is also identified in FIG. 4. Each male connector part 82 further includes a first conical section 96 positioned behind the second end. The tool receiving tip may also be formed into the end of first conical portion 96. The first conical portion 96 terminates in an inward extending edge 98. Positioned behind the edge 98 is a narrow diameter portion 100 having a diameter d2 which functions as a holding feature in combination with edge 98. Positioned behind the narrow diameter portion 100 is a second conical (truncated) portion 102 which terminates in a second inwardly directed surface 104. Positioned behind this surface 104 is a second narrowed diameter portion 106 having a diameter d3. This portion 106 and the surface 104 of conical portion 102 function as a snap-fit feature. The diameter d3 is larger than the diameter d2. The male connector part includes a third conical portion 108 extending rearwardly from portion 106. This third conical position transitions into a cylindrical or preferably conical fourth portion 110. In the preferred embodiment of the invention, this portion 110 is conically shaped having its largest diameter portion at the transition 112 adjacent portion 108. As can be seen, the narrow diameter portion 100 forms a first groove (also referred to as 100) between the cylindrical portions 96 an 102. Additionally, the larger diameter portion 106 forms a second groove between the conical portions 102 and 108.

Figure 5:
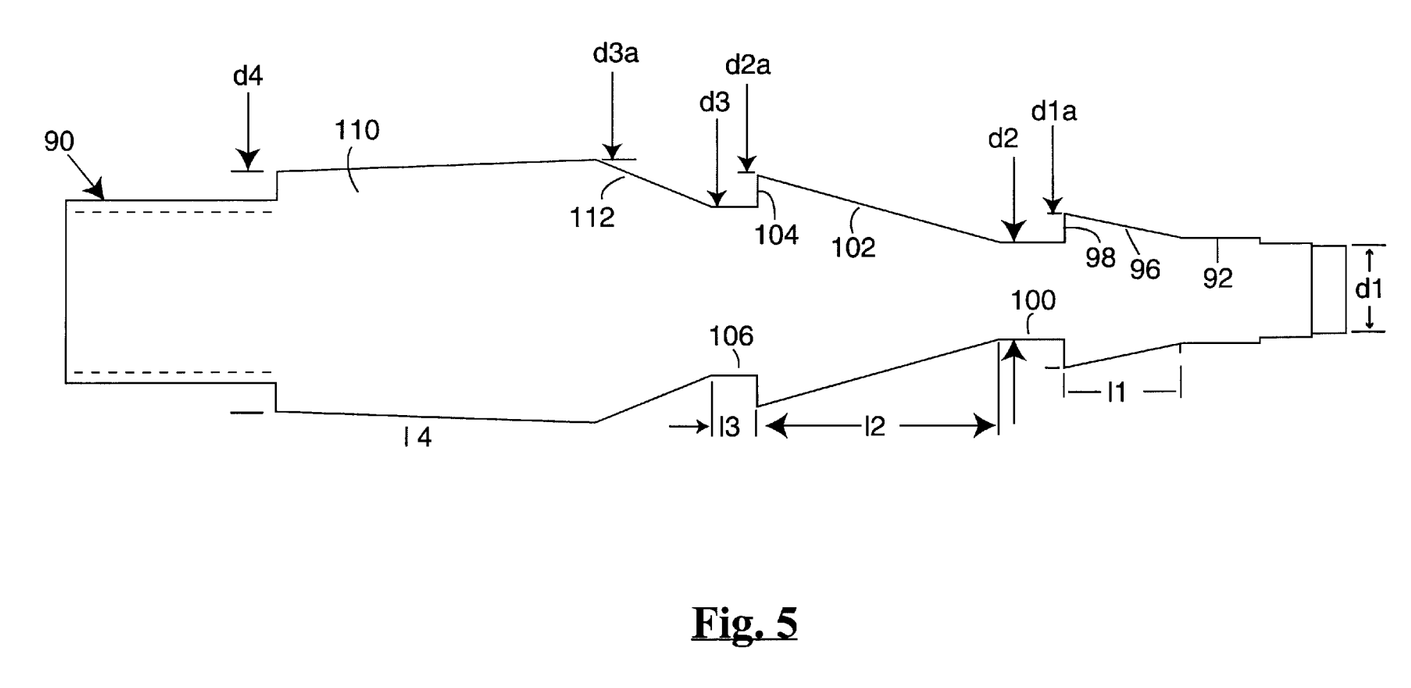
FIG. 5 is a cross-sectional view of an exemplary male connector part 82.

The lengths and diameters of the various portions of the male connector part 82 have been chosen to minimize the amount of force required to push the fastener into place, while maximizing the pull-out load. The following are the preferred dimensions of the male connector part 82: d1=4.0 mm, d1a=4.8 mm, d2=2.7 mm, d2a=8.4 mm, d3=6.0 mm, d3a=9.30 mm, d4=8.6 mm, L1=3.0 mm, L2=12.5 mm, L3=4.25 mm, L4=12.0 mm.

Figure 6:
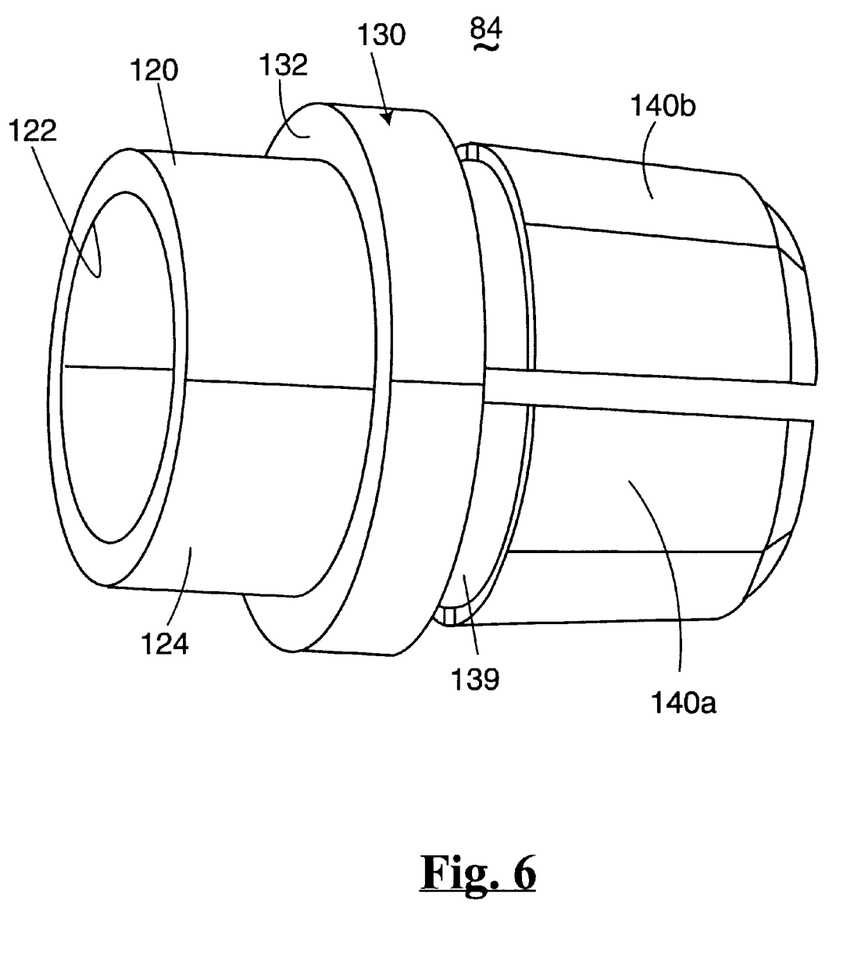
FIG. 6 is a side, isometric view of a female connector part of a snap-fit connector.
Figure 7:
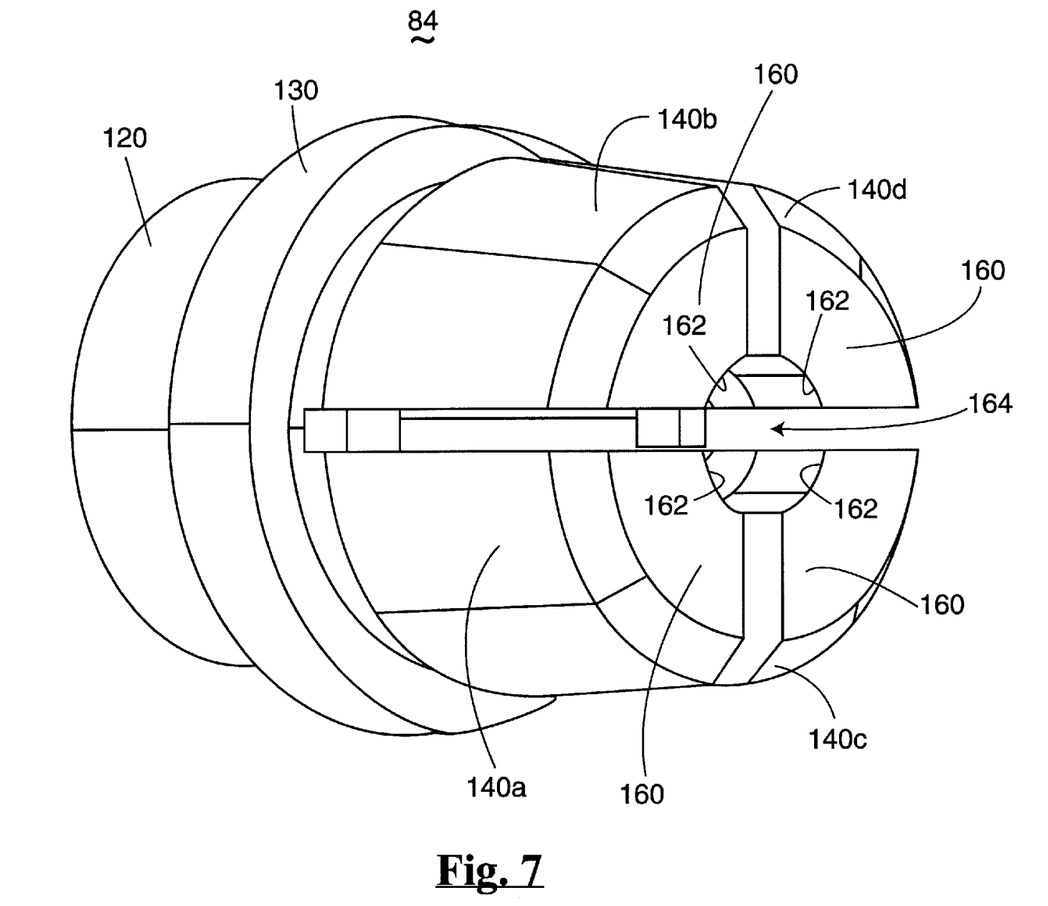
FIG. 7 is an end isometric view of a female connector part.
Figure 8:
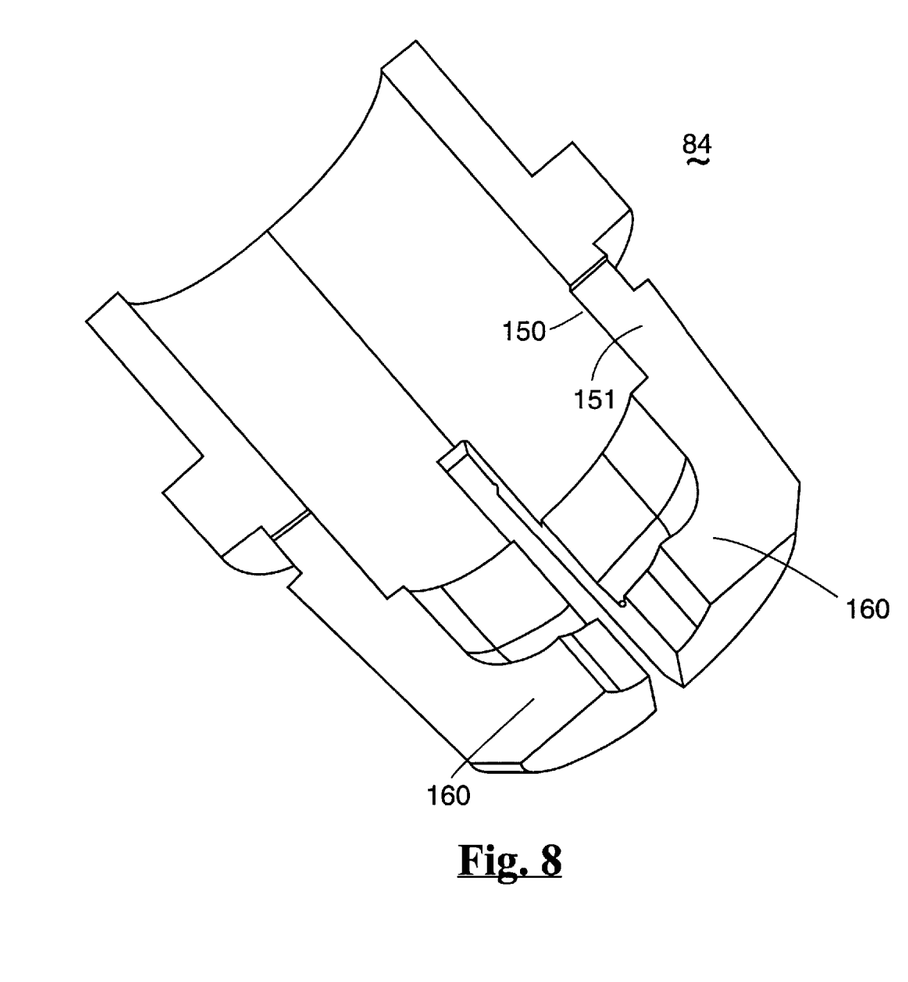
FIG. 8 is a cross-sectional view of a female connector part.

Reference is again made to FIG. 4 and to FIG. 6. The female connector part 82 includes an upper annular portion 120 with a first opening 122. The female connector part is preferably made from a polymer or a metal or metallic alloy. This annular portion 120 serves as a collar and is temporarily received about the lower portion 110a, 112 of the male connector part 82 before being inserted within the support such as the steering wheel 40. While it is preferred to use this annular portion, it is optional to the present invention. This first annular portion has a cylindrically shaped outer wall 124 concentric with the opening 122. Positioned proximate the middle of the female connector part 84 is an outwardly directed flange 130. The flange includes a top surface 132, lower or bottom surface 134 and outer surface 136. Extending downwardly from the flange 130 is a plurality of flexible members 140a–d. A receiving groove 139 is formed at the base of each receiving member 140a–d which is received in flange 64 of the support (such as the steering wheel 40). As can be seen from the various figures, such as FIGS. 4 through 8, the various flexible members 140a–140d are separated from each other to allow them to flex. The interior surfaces, such as 150 as shown in FIG. 8, close to the location of the flange 130, of each of these flexible members 140a–140d form an opening or passage of the same diameter as opening 122. The narrow portion 151 of the walls of the female connector part concentrates stresses therein so that the flexible members 140a–d flex in a preferred area. The ends of each of the flexible members 140a–140d are formed with an inwardly extending flange 160 which terminates a circular sector 162. Reference is briefly made to FIG. 7 which illustrates an end, isometric view of the female connector part 84, and more specifically shows the interrelationship of each of the flanges 160 and the circular sectors or surfaces 162. The circular sectors or surfaces 162 form another opening 164 having a diameter that is slightly greater than the diameter d2 of the male connector part 82.

Figure 9:
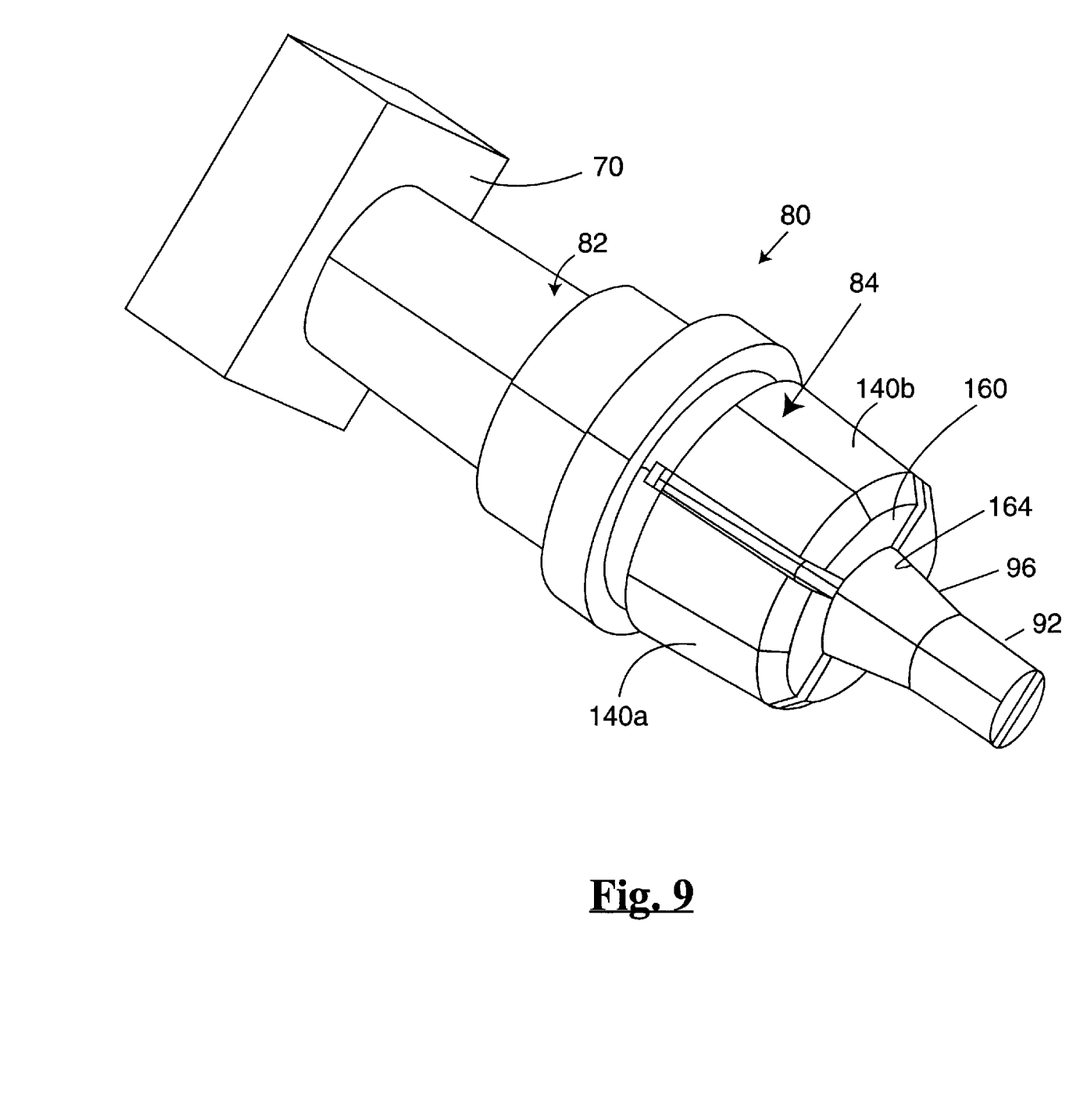
FIG. 9 illustrates an isometric view of a snap-fit connector received in a support member.

Prior to the installation of the module 22 onto the steering wheel or other support member 20, the snap connectors 80 are first secured to the housing 24. This connection was previously shown in FIG. 3. Further, prior to the installation of each snap-fit connector 80 into the module 22, the corresponding female connector portion 84 is positioned upon the male connector portion 82 as shown in FIG. 9. More specifically, end 92 is inserted within opening 122 and pushed partially through opening 164 formed by the flanges 160. The male connector part 82 is further inserted within the female connector 84 causing the surfaces 162 to ride upon the first conical portion 96 (and flex outwardly). Further inward motion of the male connector part causes the flexible members 140a–d to snap inwardly and be held at the groove or narrow diameter portion 100. As mentioned earlier, the cylindrical or annular portion 120 of the female connector resides upon the surface denoted as 112, thereby maintaining the female connector part generally coaxial with the male connector part. If the annular portion 120 were not used, the female connector portion 84 could become misaligned relative to the male connector portion 82. This would increase the amount of force required to install the fastener within the installation feature 60. It is envisioned that the male and female connector parts would be connected together prior to placement of the male connector part onto the housing 24. This would enable the manufacturer of the snap-fit connector to ship a single part to the module manufacturer. However, the two connectors parts can be shipped separately and assembled just prior to insertion upon the housing. This would allow the module manufacturer to install the male portion 82 into the housing 24, and then connect the female portion 84 to the male portion 82.

Figure 10:
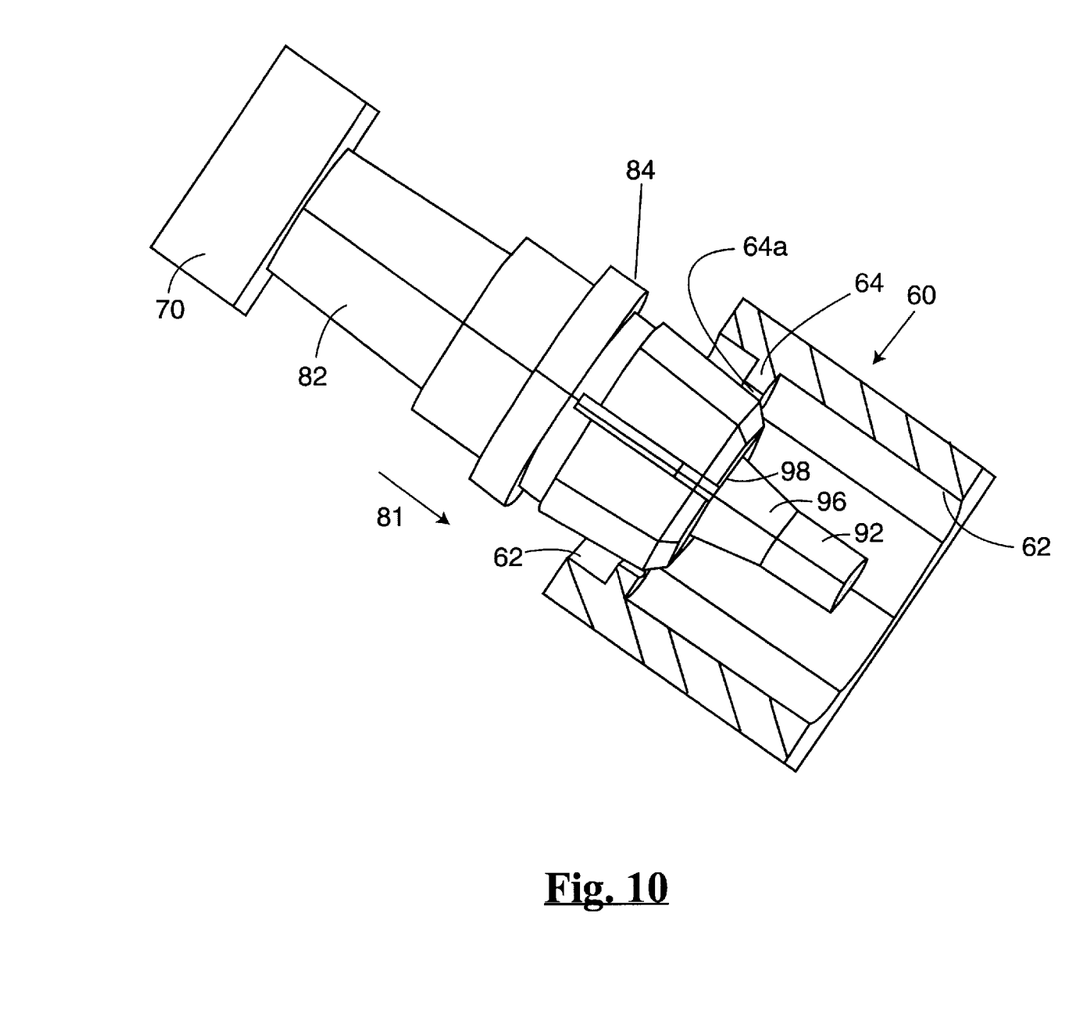
FIG. 10 illustrates an assembly step of the present invention.
Figure 11:
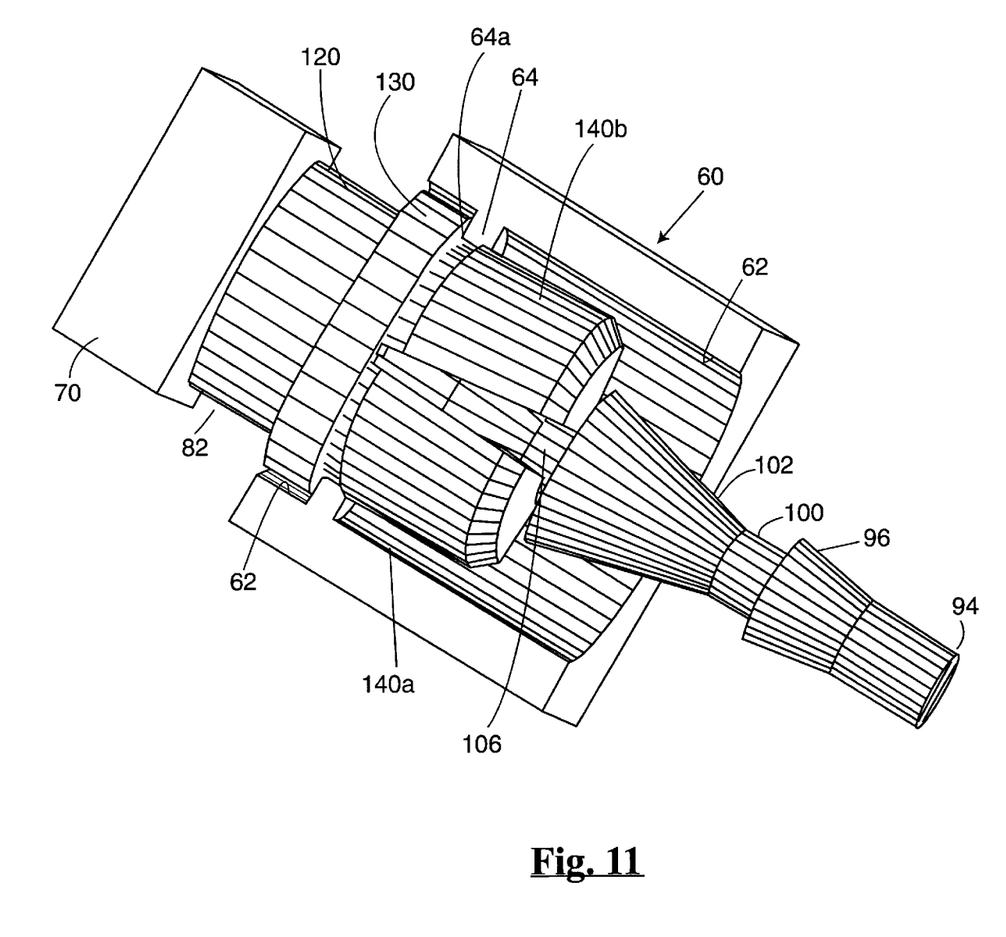
FIG. 11 illustrates a final assembly step of the present invention showing the connector within a portion of a steering wheel.
Figure 12:
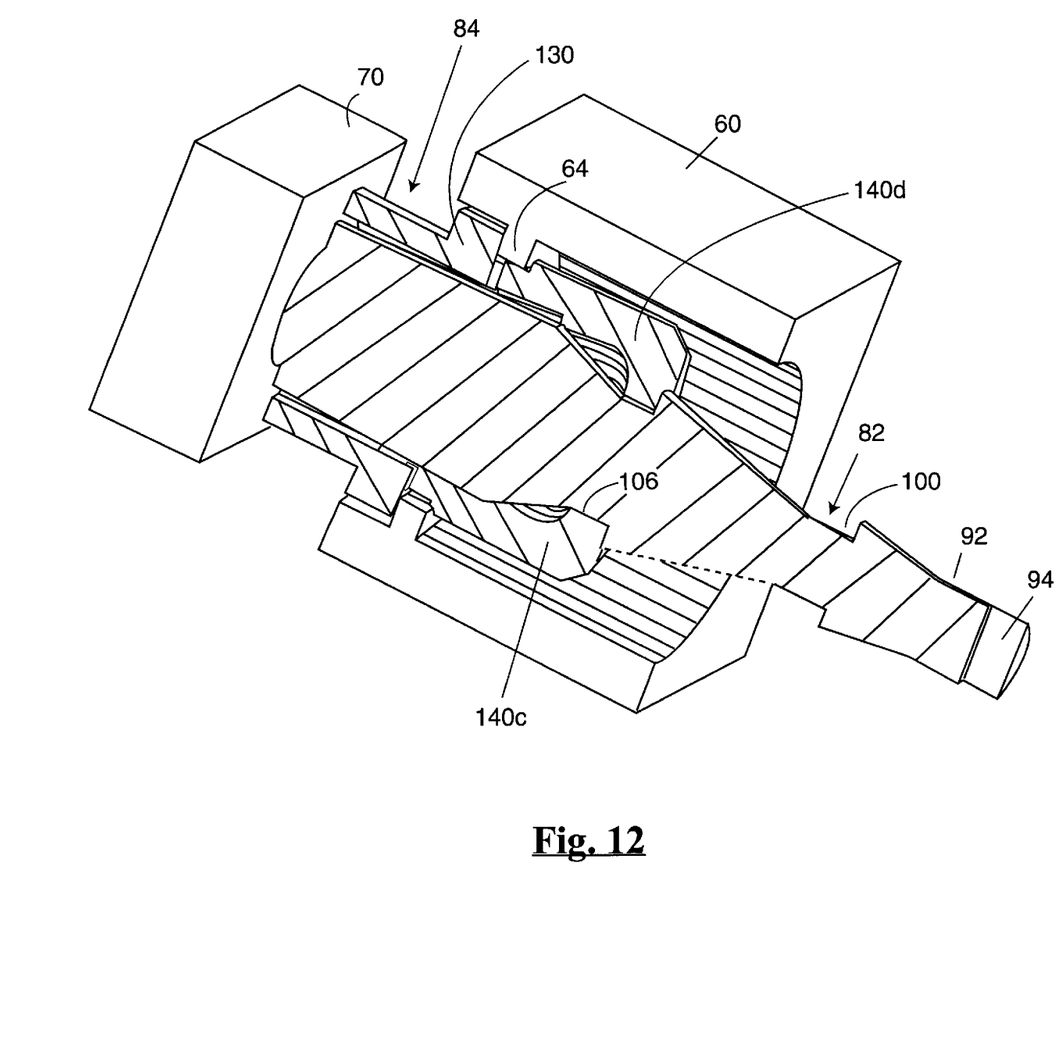
FIG. 12 is a cross-sectional view of the connector shown in FIG. 11.

With the snap-fit connectors secured to the housing 24, as illustrated in FIG. 3, the air bag module 22 is moved toward the steering wheel 40. In particular, each of the snap-fit connectors 80 is directed (see arrow 81) within a respective receiving opening 64a (and 62). As the air bag module is moved relative to the steering wheel 40, each flange 130 will engage a respective ledge 64 of the installation feature 60 or opening 64a. This relationship is shown in FIG. 10. As can be seen from FIG. 10, once the flange 130 is situated upon the rim 64, the female connector part can no longer move further within the bore or opening 62 of the steering wheel. Further insertion of the air bag module 22 permits each male connector part 82 to be moved further within its corresponding female connector part. As the male connector part is further inserted in the female connector part from the position illustrated in FIG. 10, the surfaces 162 of each of the flanges 160 ride upon the exterior surface of the second conical portion 102, causing the flexible members 148a–148d to expand outwardly. The continued insertion of the male connector part will cause relative movement (of the two connector parts) such that the various flexible members 140a–140d snap within the second, larger diameter groove 106. In this situation, the flexible members are expanded outwardly and generate an inward holding force securing each male connector part to the female connector part and thereby securing the air bag module 22 to the steering wheel 40.

One of the features of the illustrated embodiment of the present invention is that if the air bag module 22 is in need of service, the air bag module 22 can be easily removed from the steering wheel 40 by inserting a tool in the lower end of bore 62, within or upon the tip 94 and rotating the male connector part 82 so that the threads at end 90 disengage from the threads of opening 72 within the housing 24.

Having disengaged the snap-fit connector 80 from the housing 24, the module 22 is lifted from the steering wheel 40. It is now possible to disengage the male and female connector parts from the steering wheel 40. The male connector part 82 is disengaged from the steering wheel (and from the female part 84) by pushing end 90 of the male connector part 82 completely through the female connector part 84 and bore 62. This is facilitated by the reversed taper of the conical portion 110. Having disengaged the male connector part 82 from the steering wheel (and from the female connector part), the female connector part can be removed simply by lifting or pushing it upwardly out of bore 62. One advantage of the present invention is that upon disassembly of the connector parts, each part is not damaged and is capable of being reused if desired.

Many changes and modifications in the above-described embodiment of the invention can, of course, be carried out without departing from the scope thereof. Accordingly, that scope is intended to be limited only by the scope of the appended claims.

What is claimed is:

1. A system using a snap-in connector (80) comprising
   a female connector part (84) including an upper cylindrical portion (120) having a first opening (122) therethrough, and a lower portion segmented into a plurality of flexible locking members (140a–d), each of the flexible members including, at a remote end thereof, an inward flange (160) which snaps into and locks with portions of a male connector part as a function of the degree of insertion of the male connector part, an interior surface (162) of each of the flanges being spaced apart to form a first passage (164) aligned with the first opening;
   the male connector part (84) including:
      a first end serving as a means for connecting the fastener to a support member (24) and
      a remote second end (92) insertable into and through the female connector part (84), the second end including a tool receiving feature (94) permitting the male connector part to be rotated by a tool, the male connector part further including
   a plurality of conical portions which serve to outwardly separate the flexible members as the male connector part is inserted therein, a first holding (100) feature between a first (96) and a second (102) conical portion which serves to hold the female connector part to the male connector part after the male connector part has been partially inserted therein prior to insertion of the snap-fit connector into an opening (64a) of a receiving member (40), a first snap-fit locking feature (106) situated between the second conical portion and a third conical portion (112), the diameter of the first snap-fit locking feature being sufficient to separate the flexible members (140a–d) outwardly relative to the edge of the opening (64a) in the receiving member (40) as a function of the further insertion of the male connector part to prevent withdrawal of the snap-fit connector and support member;
   wherein a receiving groove (139) is formed at the base of each flexible member proximate the flanged portion, the receiving groove sized to receive edges of a receiving opening (64a) in a receiving member (40).

2. The device as defined in claim 1 wherein the support member (24) is a housing of an air bag module (22).

3. The device as defined in claim 2 wherein the receiving member is associated with an armature (42) of a steering wheel (40).

4. The device as defined in claim 3 wherein the armature (42) and the housing (24) each include mating alignment features which, when in contact, align the module to the steering wheel in a predetermined orientation.

5. The device as defined in claim 4 wherein the male connector part further includes a fourth conical portion which tapers oppositely to the taper of the third conical portion (112), whereupon with the removal of the male connector part from the support member (24), the opposite taper of the fourth conical portion permits the male connector part to be completely pushed through and hence disconnected from the female connector part.

6. A snap-in connector system comprising a connector (80) corprising a male connector part (82) and a female connector part (84),
   the female connector part (84) having
      a flanged portion (130) with a first opening (122) therethrough, including an outer edge (136), a top surface (132) and a bottom surface (134);

an annular cylindrical portion (120) protruding from the top surface (132), having an inner passage forming part of the first opening (122), allowing passage of the male connector part;

a plurality of separated, flexible members (140a–d), extending from the bottom surface (134) of the flanged portion, each of the flexible members including a remote end having an inward flange (160), an interior surface (162) of each flange being spaced from an adjacent flange to form a first passage (164) aligned with the first opening (122) to receive a portion of the male connector part;

the male connector part (82) including
- a threaded first end (90) adapted to be attached to a support member (24), and
- a remote second end (92) which is inserted into and through the first opening and first passage (164) of the female connector part, the second end including a tool receiving tip (94) enabling the male connector part to be rotated by a tool for installation to and removal from the support member, the male connector part further including
- a first conical portion (96) having an increasing diameter as a function of distance from the second end (92);
- a second conical portion (102) spaced from the first conical portion (96) and having an increasing diameter as a function of distance from the remote end;
- a first groove (100) separating the first and second conical portions, the diameter of the first groove being smaller than that of the first passage (164) of the female connector part so that the flexible members are not biased outwardly when upon the first groove;
- a third conical portion (112) spaced from an end of the second conical portion (102) and having an increasing diameter as a function of the distance from the remote end;
- a second groove (106) separating the third and second conical portions having a diameter greater than that of the first passage sufficient to cause the flexible members to expand and lock therein upon further insertion of the male connector part through the female connector part;
- a fourth conical portion (110) spaced from an end of the third conical portion (112) and having a decreasing diameter as a function of distance from the second end for permitting the male connector part to be easily pushed completely through the female connector part;

wherein a receiving groove (139) is formed at the base of each flexible member proximate the flanged portion, the receiving groove sized to fit within a receiving opening (64a) in a receiving structure.

7. The device as defined in claim 6 wherein each flexible member includes an inner surface, proximate the first opening being arcuate in shape and coincident with the contour of the first opening.

8. The device as defined in claim 6 wherein the support member (24) is a housing component of an air bag module (22).

9. The device as defined in claim 8 wherein the support member is associated with an armature (42) hub of a steering wheel (40).

10. A snap-fit configuration for air bag module (22) to enable the module to be snap fitted to a cooperating structure (40) of a vehicle:

the module including at least a housing (24) with first means (70) for receiving at least two snap-fit connectors (80), the cooperating structure including at least one relatively thin member (64) defining a receiving opening (64a) corresponding to each snap-fit fastener (80);

each snap-in fit connector (80) comprising a male connector part (82) and a female connector part (84), the female connector part (84) being of annular construction and having
- a flanged portion (130) with a first opening (122) therethrough, the flanged member including an outer edge (136), a top surface (132) and a bottom surface (134);
- a plurality of searated, flexible members (140a–d), extending from the bottom surface, each of the flexible members including a hinge at one end and a remote end having an inward flange (160), an interior surface (162) of each flange being spaced from an adjacent flange to form a first passage (164) aligned with the first opening (122) to receive a portion of the male connector part;

the male connector part (82) including
- a first end (90) adapted to be attached to a support member (24), and
- a remote second end (92) which is inserted into and through the first opening and first passage of the female connector part, the second end including a tool receiving tip (94) enabling the male connector part to be rotated by a tool for removal from and attachment to the support member, the male connector part further including:
- a first conical portion (96) having an increasing diameter as a function of distance from the second end;
- a second conical portion (102) spaced from the first cylindrical portion and having an increasing diameter as a function of distance from the remote end;
- a first groove (102) separating the first and second conical portions, the diameter of the first groove being smaller than that of the first passage of the female connector part so that the flexible members are not biased outwardly when upon the first groove;
- a third conical portion (112) spaced from an end of the second conical portion and having a decreasing diameter as a function of the distance from the remote end;
- a second groove separating the third and second conical portions having a diameter greater than that of the first passage sufficient to cause the flexible members to expand and lock therein upon further insertion of the male connector part through the female connector part wherein a receiving groove (139) is formed at the base of each flexible member proximate the flanged portion, the receiving groove sized to fit about a structure defining a receiving opening (64a) in a receiving structure.

11. The device as defined in claim 10 wherein the female connector part further includes a fourth conical portion (110) and wherein the female connector part (84) further includes an annular cylindrical portion (120) protruding from the top surface (132), having an alignment passage forming an extension of the first opening (122), allowing passage of the male connector part; wherein with the alignment passage residing upon the largest diameter part of the third conical portion and with the flanges of the flexible members in the first groove, the female connector part is maintained substantially in alignment with a longitudinal axis through the male connector part.

12. A system using a snap-in connector (80) comprising a female connector part (84) including an upper cylindrical portion (120) having a first opening (122) therethrough, and a lower portion segmented into a plurality of flexible locking members (140*a–d*), each of the flexible members including at a remote end thereof, an inward flange (160) having an interior surface (162) which snaps into and locks with and rides on portions of a male connector part as a function of the degree of insertion of the male connector part, the interior surface (162) of each of the flanges being spaced apart to form a first passage (164) aligned with the first opening;

the male connector part (54) including
- a first end serving as a means for connecting the fastener to a support member (24) and
- a remote second end (92) insertable into and through the female connector part (84), the second end including a tool receiving feature (94) permitting the male connector part to be rotated by a tool, the male connector part further including:

at least one conical portion which serves to outwardly separate the flexible members as the male connector part is inserted into the female connector part, a first cylindrical portion (106) of a predetermined diameter located behind a widest portion of the at least one conical portion, wherein the first cylindrical portion and the at least one conical portion form an annular shoulder, and wherein the predetermined diameter is of a size to sufficiently flex the members outwardly to a dimension greater than the diameter of an opening (64*a*) of a receiving member into which the female connector part is received, and with the flexible members upon the first cylindrical portion the annular shoulder is in a locking engagement with a bottom of the female connecting part;

wherein the male connector part further includes a second conical portion connected to the first conical portion, which tapers oppositely to the taper of the first conical portion (112), whereupon on removal of the male connector part from the support member (24), the opposite taper of the second conical portion permits the male connector part to be completely pushed through and hence disconnected from the female connector part;

wherein the female connector part includes an annular groove formed at the base of the flexible locking members, to locally reduced the thickness of the flexible locking members, thereby creating a hinge about which the flexible locking members can flex;

wherein the annular groove is adapted to receive an annular flange located in the receiving member within the opening.

* * * * *